United States Patent [19]

Jensen

[11] 4,090,440
[45] May 23, 1978

[54] APPARATUS FOR RECOMPACTING FIBROUS MATERIALS

[76] Inventor: Kenneth B. Jensen, P.O. Box 163, Ellensburg, Wash. 98292

[21] Appl. No.: 764,038

[22] Filed: Jan. 31, 1977

[51] Int. Cl.² .......................................... B65B 13/04
[52] U.S. Cl. ............................................ 100/4; 100/3; 100/7; 100/26; 100/188 R
[58] Field of Search .................. 100/3, 4, 7, 26, 179, 100/188, 189

[56] References Cited

U.S. PATENT DOCUMENTS

| | | | |
|---|---|---|---|
| 2,876,696 | 3/1959 | White | 100/25 |
| 2,959,118 | 11/1960 | Hager | 100/26 |
| 3,541,948 | 11/1970 | Sauer | 100/3 |
| 3,673,950 | 7/1972 | Koehler | 100/3 |

FOREIGN PATENT DOCUMENTS 910,167  11/1962  United Kingdom ................... 100/26

*Primary Examiner*—Billy J. Wilhite
*Attorney, Agent, or Firm*—Seed, Berry, Vernon & Baynham

[57] ABSTRACT

Bales of hay and the like which were bundled or baled in the field are recompressed to about one-half their original length by using a high-pressure ram on the bales after their wires have been cut and removed, over-compressing the bales and then after relaxing the over-compression, restrapping the recompacted bale through a set of strap guides which are automatically adjusted in the direction of the press stroke to guide the strap around the recompacted bale regardless of the amount of over-compression of the bale.

5 Claims, 7 Drawing Figures

APPARATUS FOR RECOMPACTING FIBROUS MATERIALS

BACKGROUND OF THE INVENTION

1. Field of the Invention

This invention pertains to recompacting apparatuses and in particular to techniques in which the strap guiding can accommodate over-compression and thus partial retraction of the recompacting platen.

2. Description of the Prior Art

Heretofore various attempts have been made to recompact field-baled fibrous hay, such as timothy, alfalfa, wheat straw and the like. The purpose of this recompacting is to reduce the volume or size of the bale from the approximately four-foot length and relatively loose compaction to approximately twenty-two inch length of high density compaction which could weigh in the vicinity of eighty-five to one-hundred ten pounds depending on the moisture content and type of hay being compacted. One of the difficulties in prior art recompacting devices for field bales is that the normal grasses or hays are extremely resilient such that if allowed to remain in a totally compressed state, the bales can snap the normal strap or wire banding materials when undergoing handling. Secondly, it is difficult to adequately strap a recompacted bale because existing equipment does not allow for movement of the strap guiding means sufficiently to accommodate the over-compression and retraction cycle necessary to allow the recompacted hay to lose some of its internal expansion stresses.

SUMMARY OF THE INVENTION

It is an object of this invention to provide an apparatus which will provide a substantial reduction in the volume of a field-baled crop material and apply new straps around the recompacted bale in such a manner that the internal stresses of the bale will not break the straps.

It is another object of this invention to provide an apparatus for economically and quickly recompacting a field-baled fibrous crop.

Basically, these objects are obtained by providing an apparatus which can receive a field-baled fibrous crop and apply a lengthwise pressure perpendicular to the alignment of the fibers of the crop to recompress the field-bale to about one-half of its normal length. The apparatus is provided with means for sensing when a desired maximum over-pressure is reached and then for retracting the platen so that the bale is relieved of part of the internal stresses. Finally the apparatus is provided with movable strap guide tracks which will maintain a continuous track around the bale during its over-compressing and retraction strokes so that the strap is assured of being directed around the bale regardless of the extent of normal over-compression.

In the method a field-baled fibrous crop is unstrapped, then compressed in a direction perpendicular to its normal field-baled fiber alignment, over-compressed to crush and break-down the fibers to overcome a part of the internal resilient pressure exerted by the fibrous material, then reducing the compressing force so as to allow partial relief of the over-compression, and then restrapping in a direction perpendicular to the alignment of the fibers to form a new stress-relieved, recompacted bale suitable for shipping.

As is readily apparent, the recompacted bale being approximately one-half the size of the original field bale is substantially easier and less expensive to ship long distances such as to foreign countries since only half the volume of cargo space is required. Secondly, the more dense recompacted bale stands up better to the rough handling during shipping.

DETAILED DESCRIPTION OF THE PREFERRED EMBODIMENTS

Figure 1:
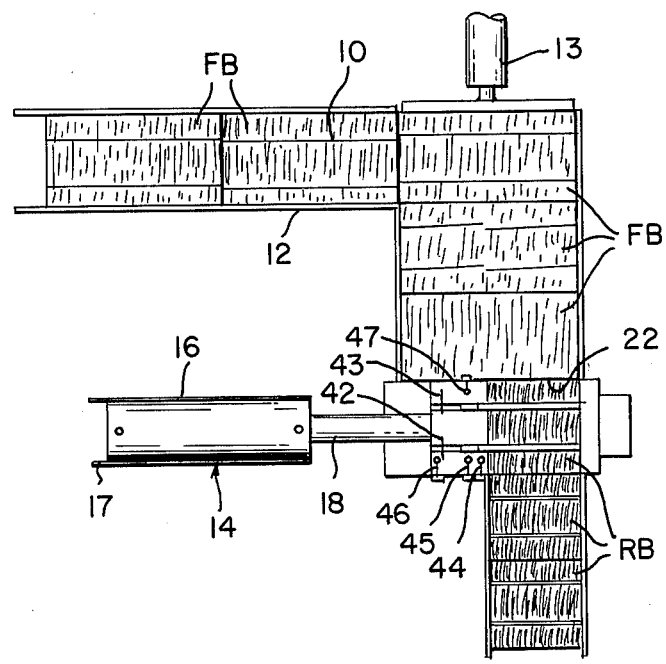
FIG. 1 is a schematic plan of a recompacting apparatus embodying the principles of the invention.
Figure 3:
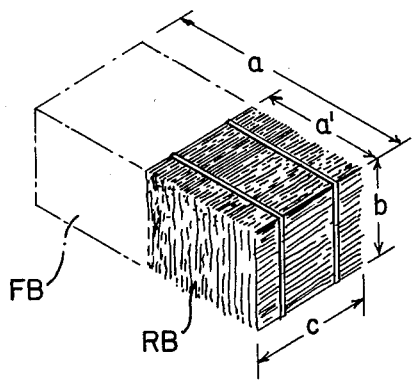
FIG. 3 is an illustration of the size reduction accomplished by the recompacting apparatus and method.
Figure 4:
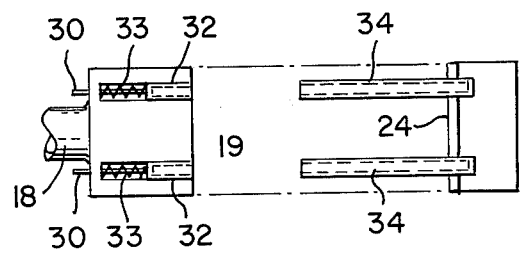
FIG. 4 is a schematic plan view, partly in section, illustrating a two-section strap track which allows the bale to be over-compressed while assuring guidance of the strap around the bale after over-compression.

As best shown in FIG. 1, field bales FB of a suitable fibrous crop such as hay (timothy, alfalfa or the like) that are used for various animal feeds around the world are provided with wires 10 with the fibers lying transversely of the bale such that the wires are wrapped in planes at right angles to the alignment of the fibers. These bales are generally of a length $a$, a height $b$ and a width $c$ as best shown in FIG. 3. The bales are fed along conventional conveyor 12 where they are then moved laterally by a conventional ram 13.

Figure 7:
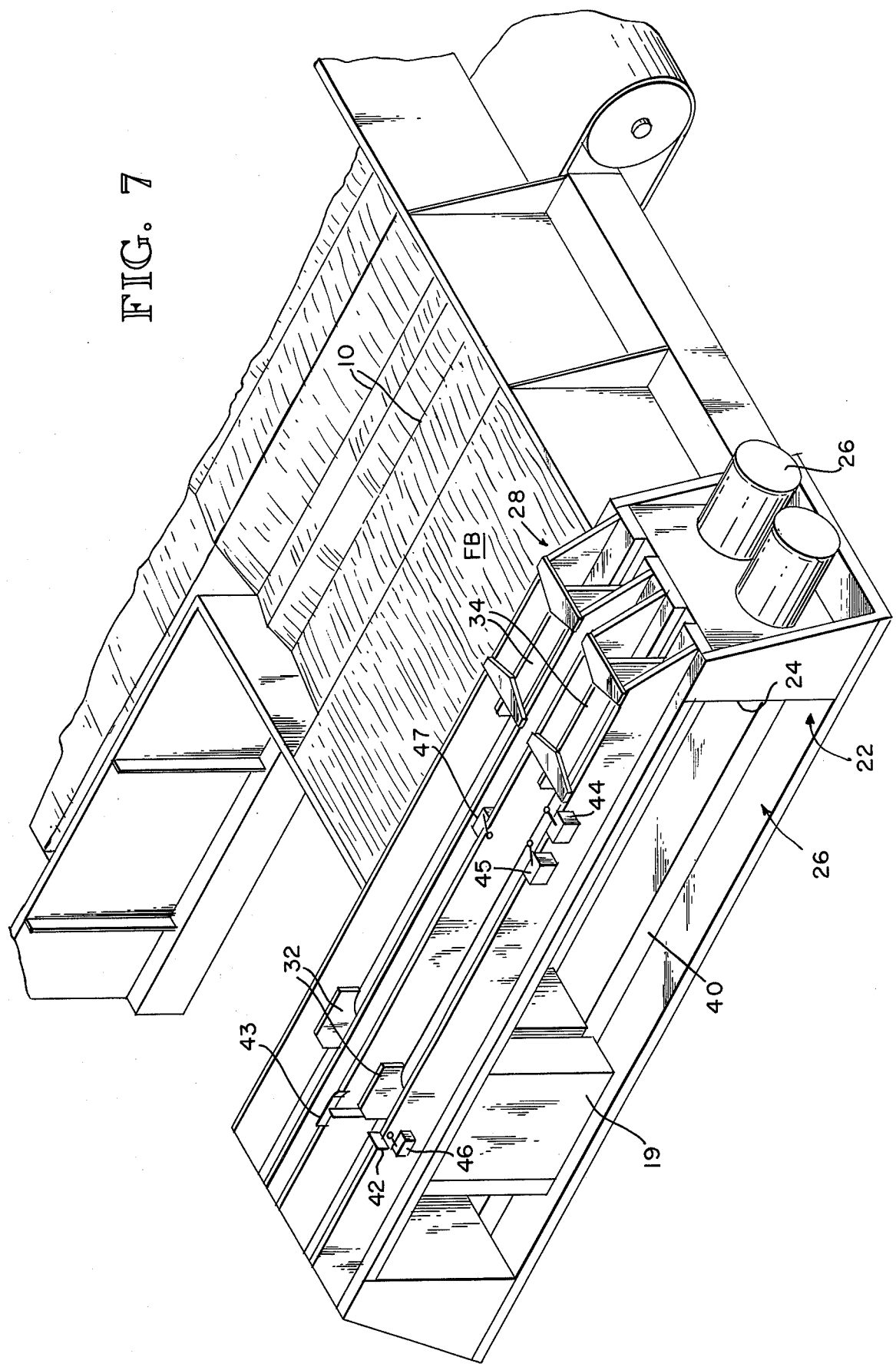
FIG. 7 is a fragmentary perspective of the recompacting apparatus embodying the principles of the invention.

A recompacting apparatus 14 is shown is FIG. 1 and includes a ram 16 fixed to a frame 17. The ram has a piston rod 18 that is fixed to a platen 19. The platen moves in a chamber 22 of a length capable of receiving at least one of the bales of length dimension $a$, and the height $b$ and width $c$. As best shown in FIG. 7, the chamber 22 has a fixed end wall 24 which supports a conventional strap or wire feeding and tying apparatus 26. A strap tying equipment manufactured by Signode Corporation, Chicago, Illinois, is suitable but other conventional wire or strap apparatus may be used. The chamber 22 has an open discharge side 26 and an open opposite feed side 28. With the open sides it can be seen that the field bales can be moved into the chamber laterally and after recompaction into recompacted bales RB discharged out the opposite side of the chamber for fast, easy handling and maintenance.

Figure 2A:
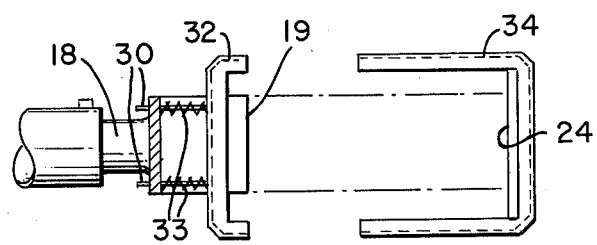
FIGS. 2A–2D are schematic operational diagrams illustrating various steps in the recompacting process.
Figure 2B:
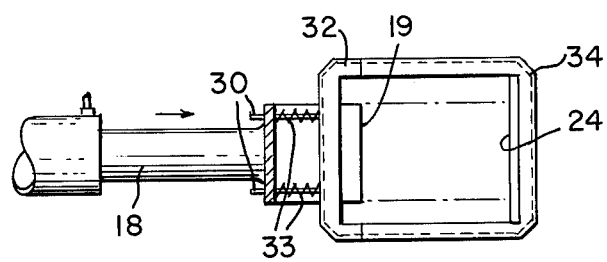
Figure 2C:
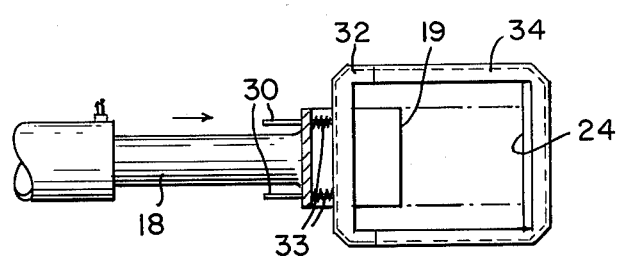
Figure 2D:
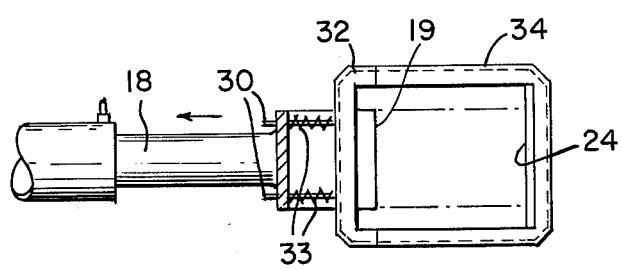

It is a unique feature of this invention that not only can the bales be over-compressed and relieved but that the strap guiding apparatus continues to function within limits regardless of the extent of over-compressing and retraction. As best shown in FIGS. 2A–2C the platen 19 is provided with guide rods 30 on which a movable strap or wire bandtrack 32 is mounted. The bandtrack is biased forwardly or toward the stationary wall 24 by springs 33. A fixed bandtrack 34 is attached in slots in the end wall 24. The bandtracks 32, 34 are conventional channels which come with the conventional strap-applying apparatus but which are made separable as shown in FIG. 2A. As shown in FIG. 2B the tracks 32 and 34 come together in abutment to provide a continuous bandtrack around the chamber. In FIG. 2C it can be seen that even though the platen has advanced further relative to the stationary wall 24 to over-compress the fibrous material. The movable bandtrack 32 remains stationary in adutment with the end of the bandtrack 34. In FIG. 2D the platen 19 is shown in a retracted position with the bandtracks still, however, remaining in a continuous track alignment so that at this point the strap can still be fed around the recompacted bale and tied or otherwise secured depending on the type of strapping apparatus.

As best shown in FIG. 7 the cycling of the apparatus to carry out the method is illustrated. The platen 19 has secured to it the movable strap guides 32 which run in slots 40 in the top and bottom of the chamber 22. Strikers 42 and 43 are also mounted on the platen and run in slots to pass respectively against switch arms 44, 45 and 46 and switch arm 47. Switch arm 46 is engaged as the platen is returning to its position furthest spaced from the end wall of the chamber 24 to signal the infeed of a field bale with its wires 10 removed. This signal indicates through conventional hydraulic circuitry to again extend the piston rod 18. As the platen then is moved toward the fixed wall 24 to recompress the field bale, the striker 42 moves until it engages switch arm 45. Switch arm 45 is adjustably mounted on the frame as is switch arm 44. Switch arm 45 is designed to operate only when the striker hits it in the reverse travel, that is when the platen is moving away from the end wall 24. Thus the striker continues past switch arm 45 and hits switch arm 44. Switch arm 44 is adjusted to depend on the desired length of the recompacted bale but is set so that over-compression of the bale occurs crushing the fibers to destroy some of their internal resiliency. When the striker hits switch 44 it indicates the over-travel or over-compression has been achieved and the hydraulics are cycled to begin retracting the platen 19. As the striker hits switch arm 45 it signals to hold the platen is a fixed position while simultaneously the striker 43 hits the switch arm 47 which operates only on the reverse stroke to signal the strap feeder 26 to feed and fasten the straps around the bale. The switch arm 47 is used to signal the strapper to operate whereas the switch arm 45 controls the stopping and starting of the platen. After the strap has been fastened, the strapper automatically signals to the hydraulic controls for the cylinder to fully retract the platen and the next bale is inserted. As each field bale is pushed into the machine, the next recompacted bale RB is pushed out of the chamber and onto a powered take-away conveyor as shown in FIG. 1.

Figure 5:
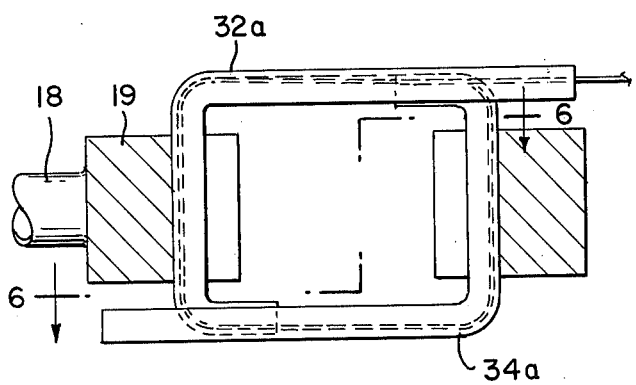
FIG. 5 is a side elevation of a second embodiment of the strap guiding mechanism to assure containment of the strap for guiding strap around the bale regardless of the amount of over-compression.
Figure 6:
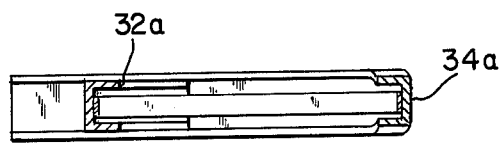
FIG. 6 is a fragmentary horizontal section taken along the line 6—6 of FIG. 5.

FIGS. 5 and 6 illustrate a modified form of strap guide to be used to accommodate over-compression and retraction of the platen. In this embodiment the movable track 32A is telescopically mounted relative to a fixed track 34A. The track 32A is widened to encompass the track 34A at the upper right-hand corner of FIG. 3 whereas it fits within track 34A in the lower left-hand corner. Thus when the platen 19 is moved into over-compression and retraction strokes the track guide sections continue to form a continuous track for the wire or strap.

While the preferred embodiments of the invention have been illustrated and described, it should be understood that variations will be apparent to one skilled in the art without departing from the principles herein.

The embodiments of the invention in which a particular property or privilege is claimed are defined as follows:

1. A device for recompacting bales of resilient fibrous crop material such as hay, comprising:
 a recompaction chamber having top, bottom and end walls,
 a platen slidably positioned in said chamber, means for reciprocating said platen,
 entry means for introducing compressed bales of fibrous crop material into said chamber,
 discharge means for discharging recompacted bales from said chamber, banding means for automatically placing bands around said recompacted bale in planes lying generally parallel to the longitudinal axis of compressive movement of said platen,
 control means for partially retracting the platen to allow partial lengthwise expansion of the recompacted bale, and
 band guide means for guiding bands lengthwise around the recompacted bale, said band guiding means including a fixed track and at least one movable track operatively coupled to said fixed track for guiding the band between the two tracks during varying stroke lengths of said platen.

2. The apparatus of claim 1, said movable track including a first vertical leg connected to upper and lower horizontal legs, said fixed track having a second vertical leg connected to upper and lower horizontal legs, reciprocable mounting means on the platen for biasing the first vertical leg toward the second vertical leg and for providing movement relative to the platen whereby the horizontal legs of the movable and fixed tracks can meet and remain engaged while the platen continues to compress and partially retract.

3. The apparatus of claim 2, said reciprocable mounting means including upper and lower rods secured to said first vertical leg of said movable track, and openings in said platen for slidably receiving said rods.

4. The apparatus of claim 1, wherein said entry means is located at one transverse side of the chamber and said discharge means is at the other transverse side of the chamber and opposite the entry means.

5. The apparatus of claim 1, including adjustable switch means for varying the amount of retraction from over-compression to hold the stress-relieved recompacted bale during banding.

* * * * *